No. 853,405. PATENTED MAY 14, 1907.
E. R. GODWARD.
TOOTH POWDER RETAINER.
APPLICATION FILED DEC. 22, 1906.
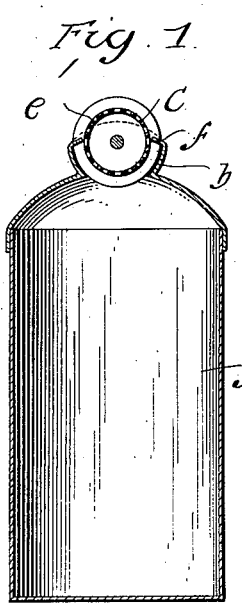
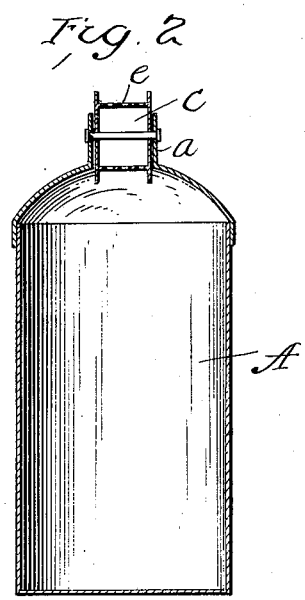
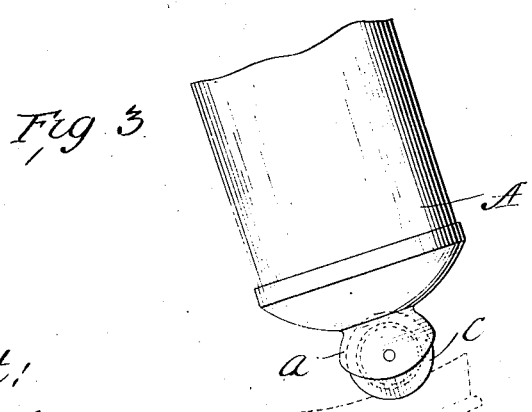
Inventor
Ernest R. Godward.

UNITED STATES PATENT OFFICE.

ERNEST ROBERT GODWARD, OF INVERCARGILL, NEW ZEALAND.

TOOTH-POWDER RETAINER.

No. 853,405.  Specification of Letters Patent.  Patented May 14, 1907.

Application filed December 22, 1906. Serial No. 349,118.

*To all whom it may concern:*

Be it known that I, ERNEST ROBERT GODWARD, a citizen of the United States, residing at Invercargill, New Zealand, have invented certain new and useful Improvements in Tooth-Powder Retainers, of which the following is a specification.

My invention is designed to provide for the discharge of tooth powder in regular quantities upon the tooth brush, so as to prevent waste, and to distribute the powder evenly over the brush from end to end.

My invention may be applied to any form of receptacle containing powder, though I have shown it in connection with a well known form of a tooth powder container.

In the accompanying drawing—Figure 1 represents the container, with my invention attached in sectional elevation. Fig. 2 is a sectional view taken at right angles to Fig. 1. Fig. 3 is a view showing the application of the invention to a tooth brush shown in dotted lines.

The container, which may be of any suitable form, is shown at A, and is cylindrical, having a tapering or conical cover. An opening is provided in the center of the cover, and this opening has side and end walls extending upwardly from the cover, as shown at $a$ and $b$. Located between these walls is a rotating carrier or cage $c$ having imperforate end disks and a perforated periphery, the end disks extending slightly beyond the periphery as shown. The perforated periphery is shown at $e$, the end walls $b$ having their upper ends turned inwardly slightly, as shown at $f$, so as to closely fit the perforated periphery of the cage. The cage freely turns in its bearings, and if the container is inverted with the tooth brush in place upon the exposed upper periphery of the carrier the powder will fall through upon the brush as the cage is rotated by the movement of the brush, and thus powder will be evenly distributed over the surface of the brush. The extending flanges of the side disks of the cage serve as guides for the brush.

The perforated cage agitates the powder in the can causing it to fall through the holes and upon the brush as the cage is revolved and so all clogging is prevented as the bristles of the brush push through the holes in the cage and keep them clear.

What I claim is:

1. A distributer for powder comprising a container and a rotating cage forming the closure for the container and located in the discharge opening thereof and having a portion of its periphery exposed, said cage having a perforated periphery whereby the powder, when the container is inverted, discharges first into the interior of the cage and from thence through the perforations to the brush, substantially as described.

2. A distributer for powder comprising a container having a discharge orifice, a rotating cage located within said discharge orifice, said cage being hollow, with a perforated periphery and having flanged side walls to serve as a guide for the tooth brush, substantially as described.

In testimony whereof, I affix my signature in presence of two witnesses.

ERNEST ROBERT GODWARD.

Witnesses:
W. W. WALLACE,
D. W. McKAY.